US007031140B2

(12) United States Patent
Omura et al.

(10) Patent No.: US 7,031,140 B2
(45) Date of Patent: Apr. 18, 2006

(54) ELECTRIC DOUBLE LAYER CAPACITOR, ELECTROLYTIC CELL AND PROCESS FOR FABRICATING SAME

(75) Inventors: Seiji Omura, Daito (JP); Kiyotaka Ito, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/998,602

(22) Filed: Nov. 30, 2004

(65) Prior Publication Data
US 2005/0207095 A1 Sep. 22, 2005

(30) Foreign Application Priority Data
Dec. 3, 2003 (JP) ............................. 2003-404083

(51) Int. Cl.
*H01G 2/10* (2006.01)

(52) U.S. Cl. ...................... 361/517; 361/502; 361/520; 361/301.3; 29/25.03

(58) Field of Classification Search ............. 361/301.3, 361/306.1, 502, 508, 512, 517–520, 531, 361/535–538, 540; 29/25.03
See application file for complete search history.

(56) References Cited
U.S. PATENT DOCUMENTS
5,420,745 A * 5/1995 Hidaka et al. ........... 361/306.1

5,682,288 A * 10/1997 Wani ........................ 361/502

FOREIGN PATENT DOCUMENTS
JP 2001-216952 8/2001

* cited by examiner

Primary Examiner—Anthony Dinkins
(74) Attorney, Agent, or Firm—Armstrong, Kratz, Quintos, Hanson & Brooks, LLP

(57) ABSTRACT

The invention provides an electric double layer capacitor which has a container made from a resin in a substantially rectangular parallelepipedal form by joining a first container half segment and a second container half segment each in the form of a box. The second container segment is provided at one end thereof with an extension extending along an outer side surface of the first container segment to the bottom outer surface thereof. A first lead member has a portion closer to one end thereof, embedded in the first container segment, the first lead member portion, bent as embedded in the first container segment and led out of the container to outside thereof. A second lead member has a portion closer to one end thereof, embedded in the second container segment, bent as embedded in the second container segment and extending through the extension to outside of the container. The first lead member portion and the second lead member portion have respective outer ends projecting outward from the container and arranged on substantially the same plane as the outer lower surface of the container.

12 Claims, 10 Drawing Sheets

PRIOR ART

ELECTRIC DOUBLE LAYER CAPACITOR, ELECTROLYTIC CELL AND PROCESS FOR FABRICATING SAME

TECHNICAL FIELD

The present invention relates to electric double layer capacitors and electrolytic cells having a container of resin and a process for fabricating these devices.

BACKGROUND ART

Small-sized electric double layer capacitors of the coin type are in wide use for cellular phones, digital cameras and like electronic devices mainly as backup power sources. As is well known, the electric double layer capacitor of the coin type comprises a pair of polarizable electrodes having a separator interposed therebetween and housed in an inside space defined by a pair of metal cans arranged as insulated from and opposed to each other. The polarizable electrodes and the separator are impregnated with an aqueous or nonaqueous electrolyte.

For use on circuit boards, electronic components have been made in chip form in increasing quantities, so that rectangular areas are generally provided on circuit boards for mounting electric double layer capacitors thereon. However, if the coin-type electric double layer capacitor is provided in the rectangular mount area, the capacitor, which is in the form of a disk, leaves large vacant spaces at the corner portions of the mount area. For this reason, it is difficult to efficiently arrange various electronic components including the capacitor on the circuit board to be used for mounting the capacitor. Further in order to make the mounting step for circuit boards efficient, it is desired that the electric double layer capacitor be made in the form of a chip like other electronic components.

If the electric double layer capacitor is given a rectangular contour, the mount area can be utilized effectively with the vacant spaces diminished. Especially because a capacitor of increased size is then mountable, the capacitor so shaped has the advantage of being greater in capacity. However, when rectangular metal cans are used for conventional electric double layer capacitors, it is difficult to seal off the interstices between the metal cans with a gasket. Accordingly, study is under way for making containers from an insulating resin for use with electric double layer capacitors (see the publication of JP-A No. 2001-216952). The capacitor of the type mentioned can then be given a rectangular contour and made available in chip form.

FIGS. 13A to 13C are a perspective view and sectional views for illustrating an electric double layer capacitor having a resin container and an example of process for fabricating the same. As shown in FIG. 13A, a first container half segment 2 and a second container half segment 3, each box-shaped, are made first. Lead members 7, 8 each in the form of a flat plate are provided on the bottom walls defining recesses 20, 30. The container segments 2, 3 are made by insert molding, with the lead members 7, 8 extending through the respective segments 2, 3.

Next, these container segments 2, 3 are fitted together in combination as shown in FIG. 13B. At this time, a pair of polarizable electrodes 4, 5 and a separator 6, which are impregnated with an electrolyte, are arranged in superposed layers within a closed space defined by the container segments 2, 3 with the recesses 20, 30 facing toward each other. The electrodes 4, 5 are connected by current collecting members 9, 10 to the lead members 7, 8, respectively, and the separator 6 is interposed between the electrodes 4, 5.

Subsequently, the container segments 2, 3 are joined by ultrasonic welding to make a container 1. The platelike lead members 7, 8 are thereafter bent along the outer surface of the container 1 to position the outer ends of these lead members 7, 8 on the lower surface of the container 1. FIG. 13C shows the electric double layer capacitor completed by the above procedure and having the contour of a chip-type electronic component. The outer end portions of the lead members 7, 8 provide electrodes to be soldered when the capacitor is mounted on a circuit board.

Unlike other electronic components having a resin container, the electric double layer capacitor comprising a resin container internally has the polarizable electrodes and separator which are impregnated with an electrolyte. Accordingly, if the metal lead members 7, 8 extend through the container 1 as shown in FIG. 13C, the electrolyte is likely to leak to the outside by passing between the container 1 and the portions of the lead members 7, 8 embedded in the container 1 (arranged in the resin forming the container 1). Furthermore, the water ingressing into the container 1 from outside by passing between the container 1 and the lead members 7, 8 becomes mixed with the electrolyte and is likely to impair the performance of the capacitor.

When the lead members 7, 8 are bent in the process shown in FIGS. 13A to 13C, the force applied to these members 7, 8 is very likely to create an interstice between the container 1 and the lead members 7, 8. Additionally, the adhesion between the resin and the metal is generally low. To prevent the leakage of the electrolyte and the ingress of water, therefore, it is desired not to bend the lead members 7, 8 after the container segments 2, 3 are made by insert molding in fabricating the electric double layer capacitor having the resin container.

Further in order to prevent or diminish the leakage of the electrolyte and the ingress of water, it is effective that the path of flow of the electrolyte or water be elongated and complex. Because the electrolyte or water passes between the container 1 and the lead members 7, 8, it is desirable that the portions of the lead members 7, 8 embedded in the container 1 have the greatest possible length and be not straight.

Aqueous or nonaqueous electrolytic cells resemble electric double layer capacitors in construction, so that the fabrication of aqueous or nonaqueous electrolytic cells having a resin container also involves the above problem.

An object of the present invention is to overcome the above problem, to provide an electric double layer capacitor and an electrolytic cell which have a construction diminished in the likelihood of leakage of the electrolyte or ingress of water by allowing the liquid to pass between the container and the lead members, and to provide a process for fabricating these devices.

SUMMARY OF THE INVENTION

The present invention provides an electric double layer capacitor which comprises a container made from a resin in a substantially rectangular parallelepipedal form by joining a first container half segment and a second container half segment each in the form of a box. The container has housed therein a pair of polarizable electrodes impregnated with an electrolyte. The second container segment is provided at one end thereof with an extension extending along an outer side surface of the first container segment to the bottom outer surface thereof.

A platelike first lead member is provided on the bottom wall of a recessed portion of the first container segment and is electrically connected to one of the pair of the polarizable electrodes. A platelike second lead member is provided on the bottom wall of a recessed portion of the second container segment and is electrically connected to the other electrode.

The first lead member has a portion closer to one end thereof, embedded in the first container segment, bent as embedded in the first container segment and led out of the container to outside thereof. The second lead member has a portion closer to one end thereof, embedded in the second container segment, bent as embedded in the second container segment and extending through the extension to outside of the container.

The first lead member portion and the second lead member portion have respective outer ends projecting outward from the container and arranged on substantially the same plane as an outer lower surface of the container.

The present invention provides a process for fabricating an electric double layer capacitor including the step of making a first container half segment in the form of a box by insert molding, the first container segment having a platelike first lead member disposed on a bottom wall of a first recessed portion thereof, the first lead member having a portion closer to one end thereof and embedded in the first container segment, the first lead member portion being bent as embedded in the first container segment and having an outer end positioned on substantially the same plane as a bottom outer surface of the first container segment.

The fabrication process of the invention includes the step of making a second container half segment in the form of a box by insert molding, the second container segment having a platelike second lead member disposed on a bottom wall of a second recessed portion thereof, the second lead member having a portion closer to one end thereof and embedded in the second container segment, the second lead member portion being bent as embedded in the second container segment and extending along an extension of the second container segment formed at one end thereof, the second lead member portion having an outer end projecting outward from an outer side surface of the extension and positioned on substantially the same plane as an end face of the extension.

The process of the invention includes the step of joining a first polarizable electrode to the first lead member directly or with a first current collecting member interposed therebetween and impregnating the first electrode with an electrolyte, and the step of joining a second polarizable electrode to the second lead member directly or with a second current collecting member interposed therebetween and impregnating the second electrode with the electrolyte.

The process of the invention further includes the step of making a substantially rectangular parallelepipedal container by joining the first container segment and the second container segment in combination so that the end face of the extension is positioned on substantially the same plane as the bottom outer surface of the first container segment.

The present invention provides an electrolytic cell and a process for fabricating the electrolytic cell which correspond to the capacitor and the process for fabricating the capacitor described above, wherein one of the polarizable electrodes is replaced by a positive electrode and the other thereof by a negative electrode.

The electric double layer capacitor and the electrolytic cell of the invention comprise the container half segments and lead members described above and can therefore be fabricated without bending the lead members after the container segments are made. With no great force applied to the lead members, the adhesion or intimate contact between the container and the lead members is unlikely to become impaired during the fabrication. The lead members are embedded in the container and bent as embedded in the resin forming the container (for example, in a wall portion or bottom portion), with the result that the lead members are in contact with the container at portions thereof having an increased length and a complex form. Especially the portion of the second lead member in contact with the container has an increased length since this lead member extends through the extension. With the capacitor and cell of the invention, therefore, it is difficult for the electrolyte in the container or the outside water to flow between the container and the lead members.

Further with the electric double layer capacitor and the electrolytic cell of the invention, the first and second lead members have outer end portions projecting outward from the side wall of the container to provide electrode terminal portions. Accordingly, these portions are adjustable in length. Further with the capacitor and cell of the invention, the outer ends of the first and second lead members are not limited in the position relationship therebetween, so that these outer end portions can be made to project, for example, in opposite directions to each other, vertically or in parallel.

The process of the invention for fabricating an electric double layer capacitor or electrolytic cell is suitable for fabricating the capacitor or cell of the invention. With the process of the invention, the container half segments are made by insert molding using the lead members, which are bent before molding, as insert members. This eliminates the need to bend the lead members after the container segments are made. Electric double layer capacitors and electrolytic cells wherein the lead members are in contact with the container over complex areas of increased length can be fabricated easily by the process of the invention, while the outer end portions of the lead members are adjustable in length.

DETAILED DESCRIPTION OF THE INVENTION

Figure 1A:
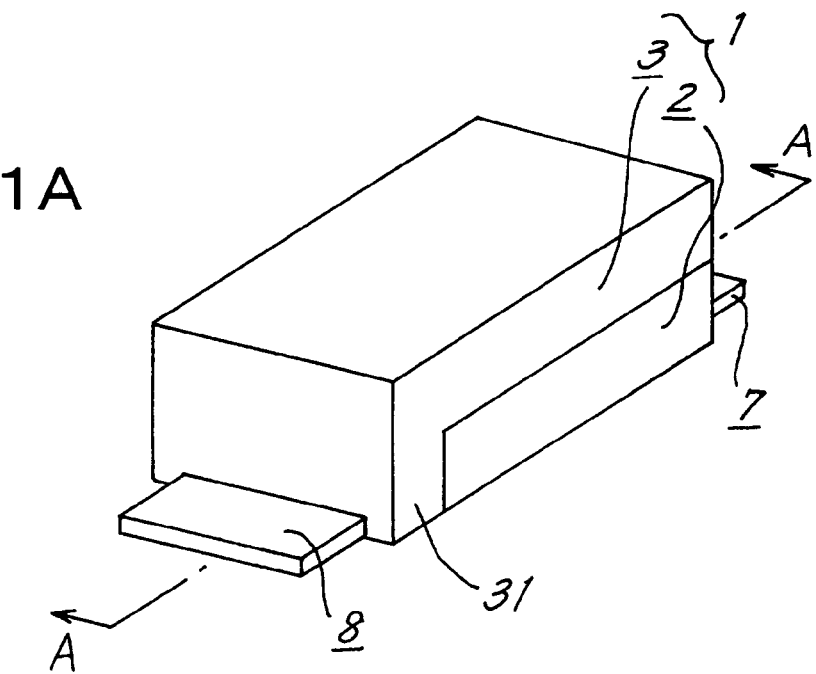
FIG. 1A is a perspective view of a first embodiment of the invention, i.e., an electric double layer capacitor or an electrolytic cell.
Figure 13A:
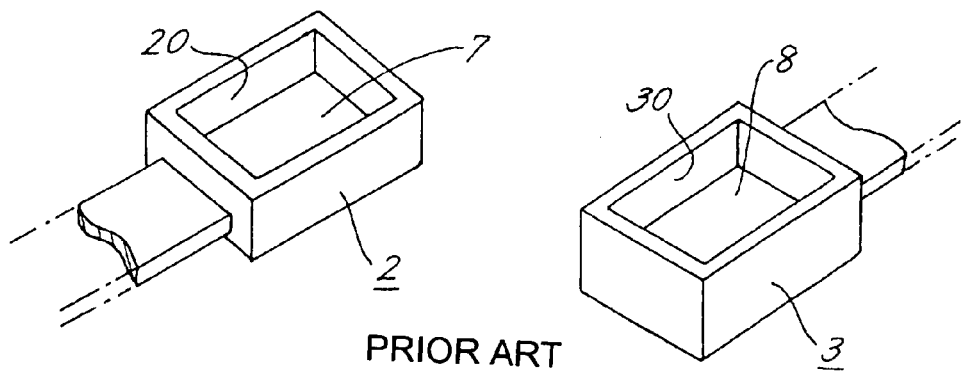
FIG. 13A is a perspective view showing a conventional process for fabricating an electric double layer capacitor having a resin container.
Figure 13B:
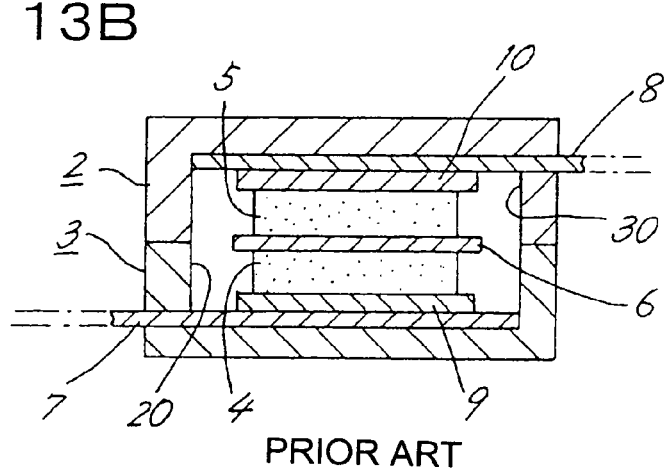
FIG. 13B is a sectional view of the same.

The present invention will be described below with reference to the drawings concerned. Throughout these drawings and FIGS. 13A to 13C, like parts are designated by like reference numerals. FIG. 1A is a perspective view showing a first embodiment of the invention, i.e., an electric double layer capacitor, and FIG. 1B is a view in section taken along a vertical plane containing the line A—A in FIG. 1A and showing the capacitor as it is seen in the direction of the arrows shown.

With reference to FIG. 1A, the electric double layer capacitor of the present embodiment has a container 1 having a generally rectangular parallelepipedal contour and made of an insulating resin. The container 1 is made, for example, from epoxy resin, liquid crystal polymer (LCP), modified polyamide, nylon resin, polypropylene (PP) or like thermoplastic resin. The container 1 is made by joining a first container half segment 2 and a second container half segment 3 (see FIG. 4). The second container segment 3 is disposed on the first container segment 2 and has one end extending downward (perpendicular to the bottom wall of the recessed portion 30 to be described later) along the outer surface of a side wall of the first container segment 2. This extension 31 has an end face positioned on substantially the same plane as the outer surface of the bottom of the first container segment 2. First and second lead members 7, 8 have end portions projecting outward from respective two opposed side walls of the container 1 longitudinally of the container 1.

Figure 1B:
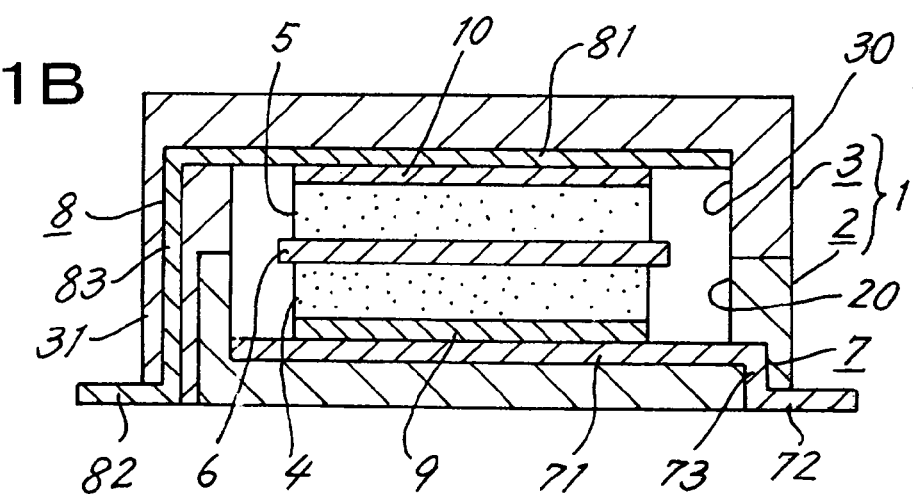
FIG. 1B is a sectional view of the same.

As shown in FIG. 1B, the inside space of the container 1 is formed by the combination of recesses 20, 30 formed respectively in the first and second container segments 2, 3. Arranged in the inside space are a first polarizable electrode 4, second polarizable electrode 5 and separator 6 which are impregnated with an electrolyte. For example, an activated carbon powder or activated carbon fiber shaped in the form of a sheet or block is used for the first and second polarizable electrodes 4, 5. A nonwoven fabric of glass fiber, paper made from pulp, film of insulating resin such as polytetrafluoroethylene (PTFE) or the like is used for the separator 6.

In the case where the electric double layer capacitor is of the nonaqueous type, the electrolyte to be used is an electrolytic solution prepared by dissolving an electrolyte, such as triethylmethylammonium tetrafluoroborate ($Et_3MeNBF_4$) or tetraethylammonium tetrafluoroborate ($Et_4NBF_4$), in a carbonate, lactone, nitrile or like organic solvent. In the case where the electric double layer capacitor is of the aqueous type, the electrolyte to be used is an aqueous solution of $H_2SO_4$, KOH or the like.

The first lead member 7 which is in the form of a plate is provided on the inside bottom surface of the container 1, namely, on the bottom wall defining the recess 20 of the first container segment 2. The first lead member 7 has one end portion extending through the container 1, more specifically, through a side wall of the segment 2 and the bottom thereof and is led out of the container 1 to the outside. The first lead member 7 is bent downward within the side wall of the first container segment 2 and is further bent laterally at the bottom of the segment 2.

The second lead member 8, which is in the form of a plate, is provided on the inside upper surface of the container 1, namely, on the bottom wall defining the recess 30 of the second container segment 3. The second lead member 8 has one end portion extending through the container 1, more specifically, through a side wall of the segment 3 and the extension 31 thereof and is led out of the container 1 to the outside. The second lead member 8 is bent downward within the side wall of the second container segment 3. The second lead member 8 extends downward through the side wall and the extension 31 and is bent laterally at the lower end of the extension 31.

Within the inside space of the container 1, a platelike first current collecting member 9 is joined to the first lead member 7. The first polarizable electrode 4 is joined at its lower surface to the upper surface of the first current collecting member 9. A platelike second current collecting member 10 is joined to the second lead member 8. The second polarizable electrode 5 is joined at its upper surface to the lower surface of the second current collecting member 10. The separator 6 is provided between the upper surface of the first electrode 4 and the lower surface of the second electrode 5.

The outer end portions of the lead members 7, 8 projecting outward from the opposed two side walls of the container 1 provide electrode terminal portions to be soldered when the capacitor is mounted on the circuit board. These outer end portions are arranged on substantially the same plane as the outer lower surface of the container 1. Stated more strictly, the lower surfaces of these end portions are arranged on substantially the same plane as the outer lower surface of the container 1. The outer lower surface of the container 1 comprises the outer surface of the bottom of the first container segment 2 and the end face of the extension 31 of the segment 2.

The first and second lead members 7, 8 are made from an electrically conductive material, such as copper, nickel, aluminum or like metal, or stainless steel or like alloy. In the case where the electric double layer capacitor is of the nonaqueous type, the first and second current collecting members 9, 10 are made from aluminum, titanium, stainless steel or the like. In this case, therefore, the first and second lead members 7, 8 may be made, for example, from aluminum or stainless steel which is a suitable material for the current collecting member, and the first polarizable electrode 4 may be joined directly to the first lead member 7, and the second polarizable electrode 5 to the second lead member 8.

In the case where the electric double layer capacitor is of the aqueous type, the first and second current collecting members 9, 10 are made, for example, from an electrically conductive butyl rubber. To prevent the lead members 7, 8 from coming into contact with the electrolyte in this case, it is desirable to modify the first and second current collecting members 9, 10 shown in FIG. 1B in shape so that the surfaces of the lead members 7, 8 will not be exposed to the inside space of the container 1.

Figure 13C:
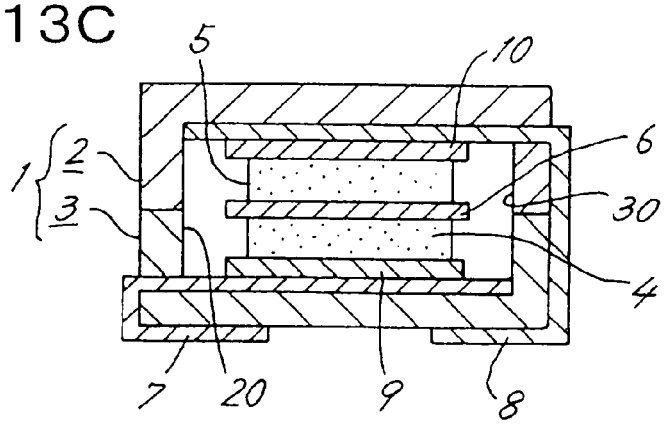
FIG. 13C is a sectional view showing the capacitor as completed.

With the capacitor of the first embodiment, the first and second lead members 7, 8 penetrate through the container 1 while being bent, so that the penetrating portions of the first and second lead members 7, 8 have a longer and more complex surface area of contact with the container 1 than in the conventional capacitor shown in FIG. 13C. This makes it difficult for the electrolyte inside the container 1 to pass between the container 1 and the first and second lead members 7, 8 for leakage or for the water in the atmosphere to ingress into the container 1. Further since the first and second lead members 7, 8 project outward from the side walls of the container 1, the length of the projecting portions, i.e., the length of the electrode terminal portions to be soldered to the circuit board is adjustable as desired.

Figure 2:
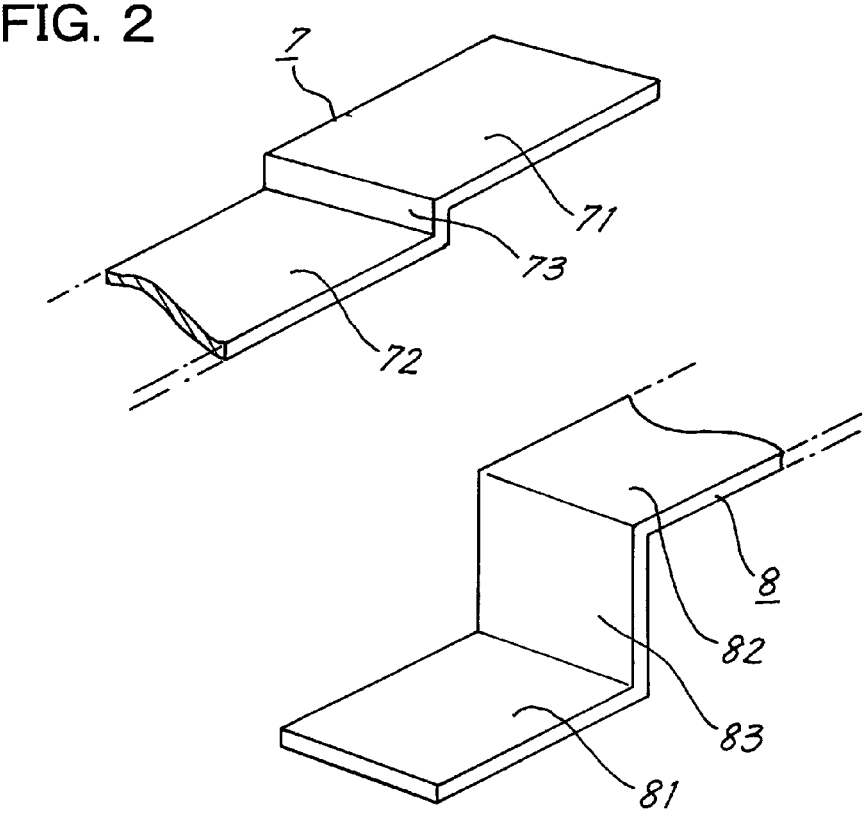
FIG. 2 is a perspective view of a first and a second lead member of the capacitor or the cell of the first embodiment of the invention.

The electric double layer capacitor of the first embodiment is fabricated by the process to be described below. First, a strip of metal plate is bent stepwise to make a first lead member 7 and a second lead member 8 as shown in FIG. 2. The first lead member 7 comprises a first flat plate portion 71, a second flat plate portion 72 and a vertical portion 73 interconnecting these portions. The first and second flat plate portions 71, 72 are parallel to each other. As shown in FIG. 1B, the first flat plate portion 71 is provided on the bottom wall of the recessed portion of a first container half segment 2, and one end of the first plate portion 71 and the vertical portion 72 are arranged (embedded) in a side wall portion and bottom portion of the first container segment 2. The second flat plate portion 72, which provides the electrode terminal portion of the first lead member 7, is given a length sufficiently greater than the length of electrode terminal portion of the member 7 to be completed and shown in FIG. 1B.

As shown in FIG. 2, the second lead member 8 also comprises a first flat plate portion 81, a second flat plate portion 82 and a vertical portion 83 interconnecting these portions. The first and second flat plate portions 81, 82 are parallel to each other. As shown in FIG. 1B, the first flat plate portion 81 is provided on the bottom wall of the recessed portion of a second container half segment 3, and one end of the first plate portion 81 is positioned (embedded) in a side wall portion of the second container segment 3. The vertical portion 83 is disposed (embedded) in the side wall portion and extension 31 of the second container segment 3. The second flat plate portion 82, which provides the electrode terminal portion of the second lead member 8, is given a length sufficiently greater than the length of electrode terminal portion of the member 8 to be completed and shown in FIG. 1B, like the second flat plate portion 72 of the first lead member 7.

Figure 3:
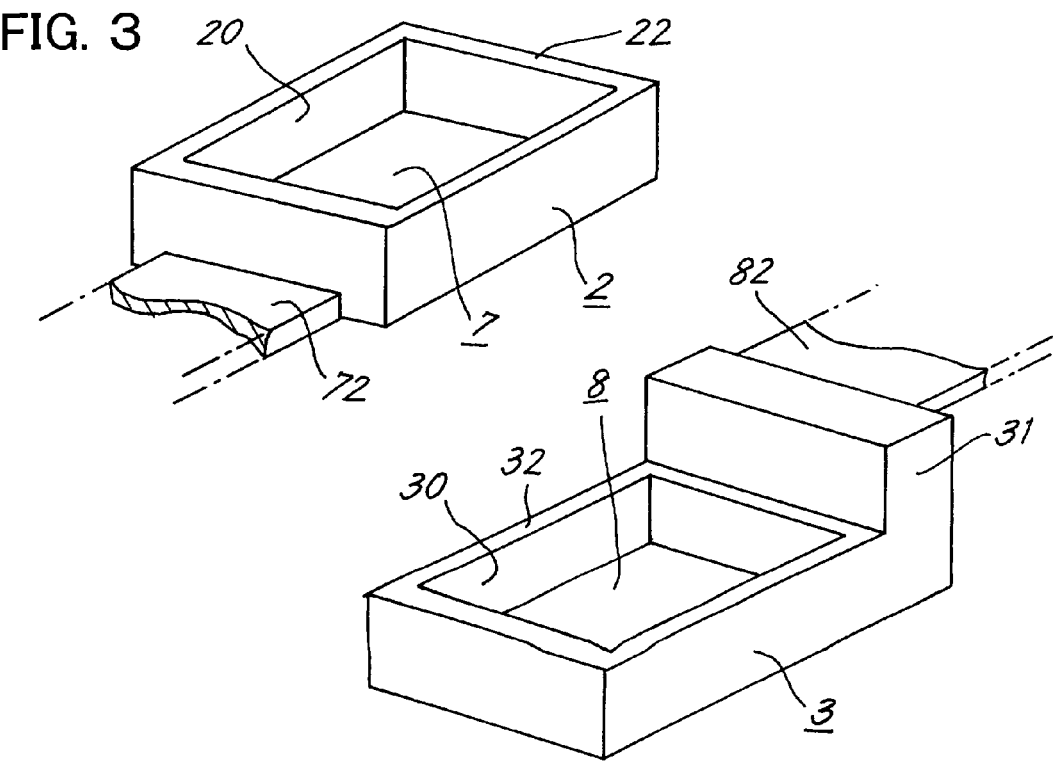
FIG. 3 is a perspective view of a first and a second container half segment of the capacitor or the cell of the first embodiment.

Next, first and second container segments 2, 3, which are box-shaped as shown in FIG. 3, are made by insert molding. After the first flat plate portion 71, vertical portion 73 and part of the second flat plate portion 72 of the first lead member 7 are inserted into the cavity of a mold, molten resin is poured into the cavity to form the first container half segment 2 on the first lead member 7. Similarly, the second container half segment 3 is formed on the second lead member 8. An extension 31 of the second container segment 3 is so formed as to extend toward the opening side of a recess 30 of the segment 3. The first and second segments 2, 3 have respective side wall end face 22 and side wall end face 32 which are each in the form of a ring, and a container 1 is made by joining these end faces 22, 32 in a later step. Although not shown in FIG. 3, one of these end faces 22, 32 has an annular ridge for use in ultrasonic welding. The ridge is melted with frictional heat due to ultrasonic vibration and thereafter solidifies, whereby the first and second segments 2, 3 are joined. (As to the ridge and ultrasonic welding, refer to FIGS. 11 and 12 and the description concerned.

When the first and second container segments 2, 3 are prepared as shown in FIG. 3, these segments 2, 3 are assembled in combination. In this step, a first current collecting member 9, second polarizable electrode 4, separator 6, second polarizable electrode 5 and second current collecting member 10 are arranged in this order in superposed layers within a closed space to be defined by the first and second segments 2, 3 as fitted together.

Figure 4:
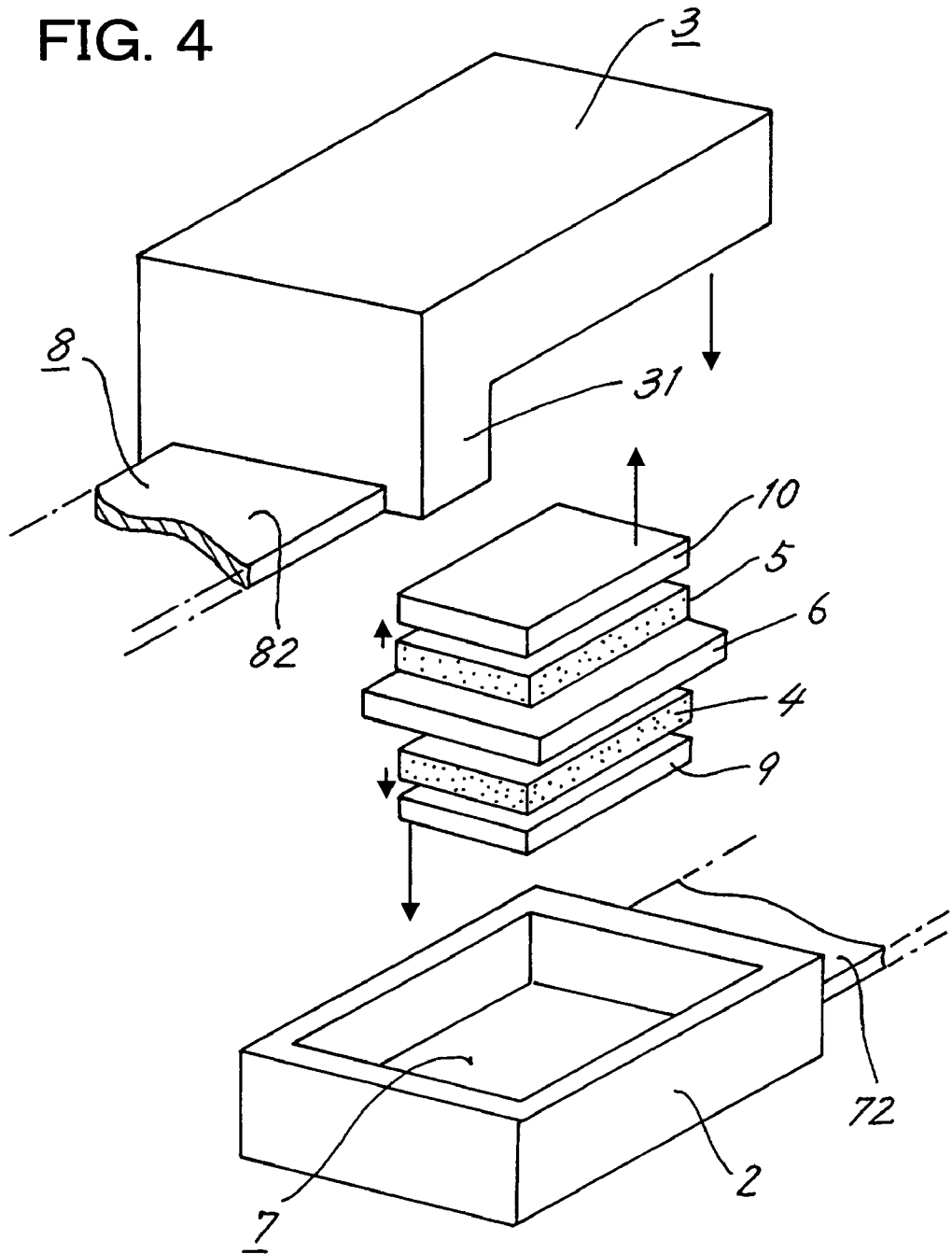
FIG. 4 is an illustration for showing a process for fabricating the capacitor or the cell of the first embodiment.

FIG. 4 is a diagram schematically showing this step. The first current collecting member 9 is joined to the first lead member 7 first. The first electrode 4 is then joined to the collecting member 9. The second current collecting member 10 is also joined to the second lead member 8, and the second electrode 5 to the second collecting member 10. An electrically conductive adhesive is used for joining the collecting members 9, 10 to the lead members 7, 8, respectively, and the electrodes 4, 5 to the respective collecting members 9, 10.

Subsequently, the electrodes 4, 5 are impregnated with an electrolyte. The first container segment 2 is positioned with its recess 20 facing upward, and the separator 6 as impregnated with the electrolyte is placed on the electrode 4. The electrolyte is thereafter poured into the recess 20 as required, and the second container segment 3 is placed, with the recess 30 down, on the first container segment 2.

After the container segments 2, 3 have been fitted together in combination, the segments 2, 3 are joined by the step of ultrasonic welding. A transducer is pressed against the outer surface of bottom wall of the second container segment 3 and produce vibration of specified frequency vertically and horizontally to melt the above-mentioned ridge. When the ridge is entirely melted, the transducer ceases the generation of vibration, permitting the solidification of the molten resin, whereby the container segments 2, 3 are joined to complete the container 1.

Finally, the second flat plate portion 72 of the first lead member 7 and the second flat plate portion 82 of the second lead member 8 are cut so as to give the desired length to the electrode terminal portions of the first and second lead members 7, 8 projecting outward from the opposed side walls of the container 1. In this way, the electric double layer capacitor shown in FIGS. 1A and 1B is completed.

In the process described above for fabricating the capacitor, the first and second container segments 2, 3 are made by insert molding, with the first and second lead members 7, 8 bent in advance. This eliminates the need to bend the first and second lead members 7, 8 after the first and second container segments 2, 3 have been made.

Thus, the fabrication process of the invention is free of the likelihood that a great force will be applied to the first and second lead members 7, 8 to impair the adhesion or intimate contact between the container 1 and the lead members 7, 8.

Figure 5A:
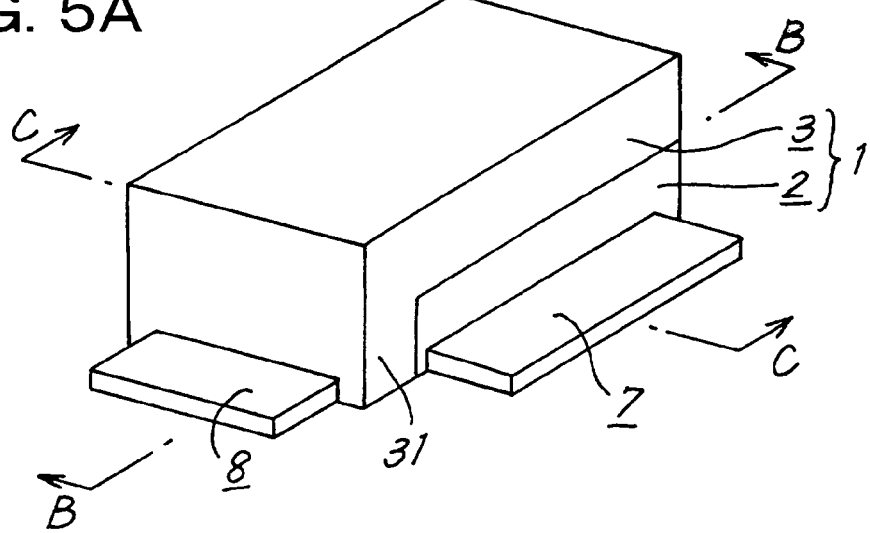
FIG. 5A is a perspective view of a second embodiment of the invention, i.e., an electric double layer capacitor or an electrolytic cell.
Figure 5B:
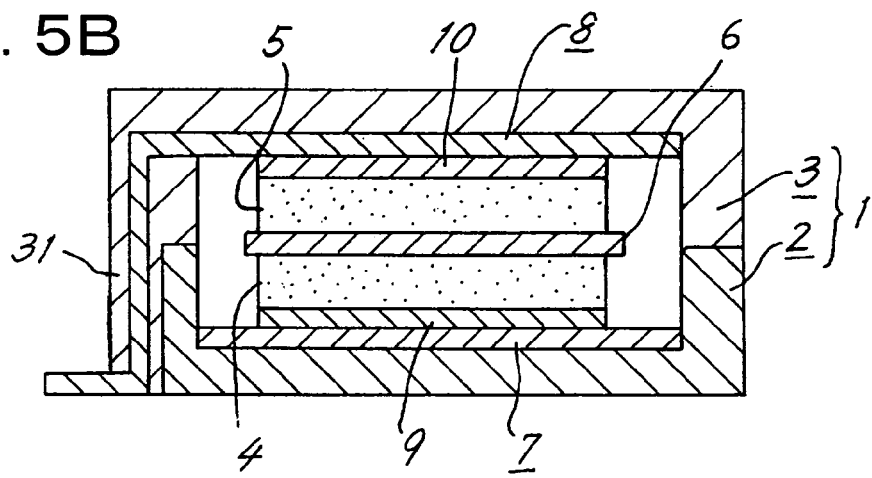
FIGS. 5B and 5C are sectional views of the same.
Figure 5C:
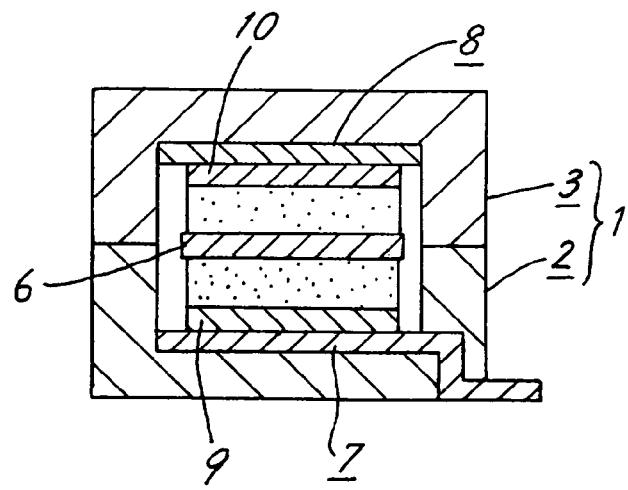

Next, a description will be given of an electric double layer capacitor of second embodiment of the invention. FIG. 5A is a perspective view of the capacitor, FIG. 5B is a view in section taken along a vertical plane containing the line B—B in FIG. 5A and showing the capacitor as it is seen in the direction of the arrows shown, and FIG. 5C is a view in section taken along a vertical plane containing the line C—C in FIG. 5A and showing the capacitor as it is seen in the direction of the arrows shown.

According to the first embodiment, the first and second lead members 7, 8 project outward from the respective two opposed side walls (extending the shorter side of the container 1) of the container 1 longitudinally of the container 1. According to the second embodiment, on the other hand, a first lead member 7 projects from one side wall (along the lengthwise direction of a container 1) of the container 1 in a direction along the short side of the container 1. The direction of projection of the first lead member 7 is perpendicular to the direction in which a second lead member 8 projects. As shown in FIG. 5C, the first lead member 7 extends through a side wall (along the lengthwise direction of the container 1) of a first container half segment 2 and through the bottom thereof to the outside of the container 1. The first lead member 7 is bent downward while extending through this side wall and is further bent laterally in the bottom portion of the segment 2. As shown in FIGS. 5B and 5C, the lead members 7, 8 have respective outer end portions (electrode terminal portions) which are positioned on substantially the same plane as the outer lower surface of the container 1. Stated more strictly, the lower surfaces of these outer end portions are positioned on substantially the same plane as the outer lower surface of the container 1.

Figure 6:
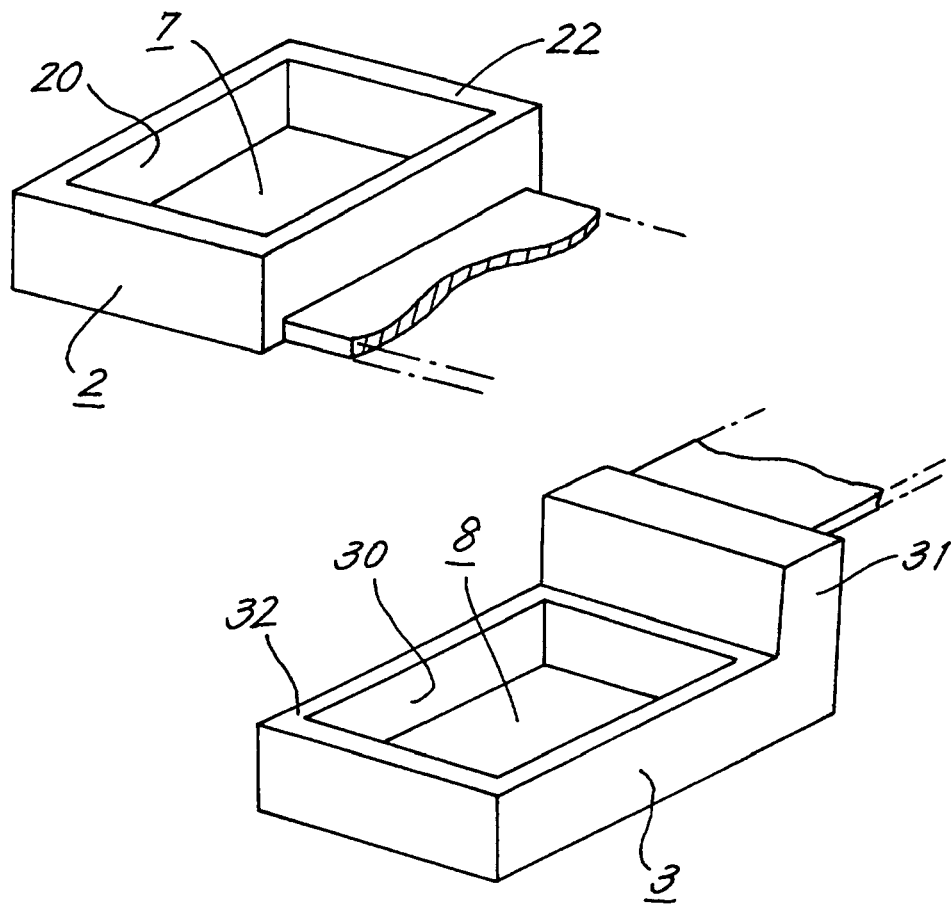
FIG. 6 is a perspective view of a first and a second container half segment of the capacitor or the cell of the second embodiment of the invention.
Figure 7:
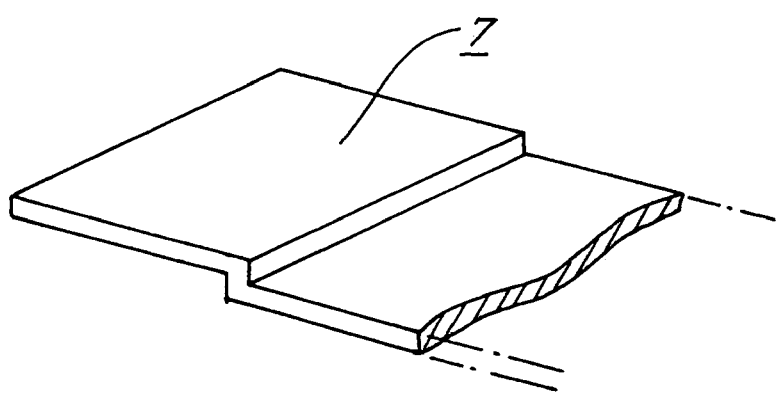
FIG. 7 is a perspective view showing a first lead member of the capacitor or the cell of the second embodiment.

The electric double layer capacitor of the second embodiment is fabricated by a process similar to the fabrication process of the first embodiment. FIG. 6 is a perspective view showing the first container half segment 2 and second container half segment 3 as made by insert molding for use in the second embodiment. The second container segment 3 and the second lead member 8 of the second embodiment are exactly the same as those of the first embodiment. The first container segment 2 of the second embodiment differs from that of the first embodiment with respect to the direction of projection of the first lead member 7 and the width of the first lead member 7. The width of the first lead member 7 is approximately the same as the width of short side of the rectangular bottom surface of the member 7 in the first embodiment but is approximately the same as the length of the bottom surface in the second embodiment. In the process for fabricating the capacitor of the second embodiment, the first lead member 7 shown in FIG. 7 is made by stepwise bending a metal plate of larger width than the one used for the first embodiment. The first container segment 2 is formed on this first lead member 7 by insert molding as shown in FIG. 6.

Figure 8A:
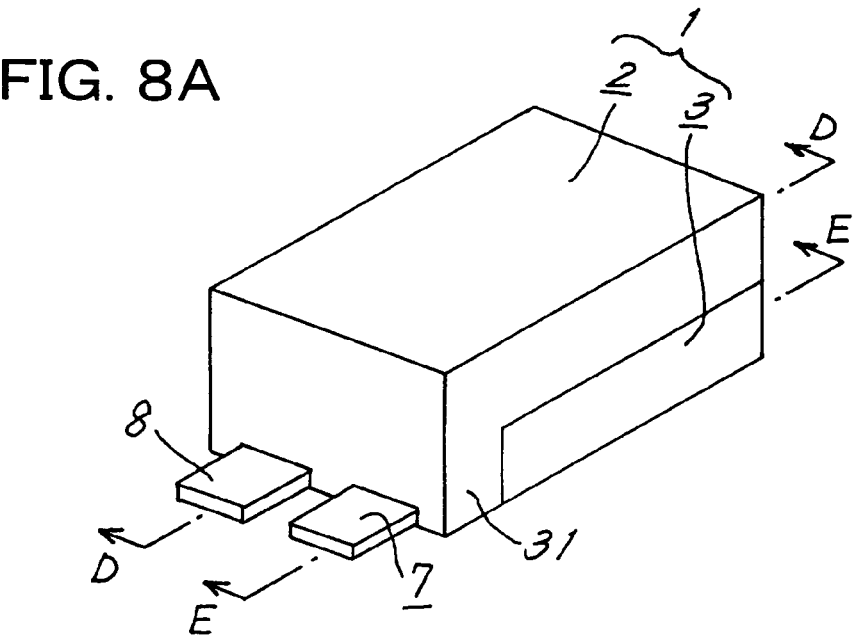
FIG. 8A is a perspective view of a third embodiment of the invention, i.e., an electric double layer capacitor or an electrolytic cell.
Figure 8B:
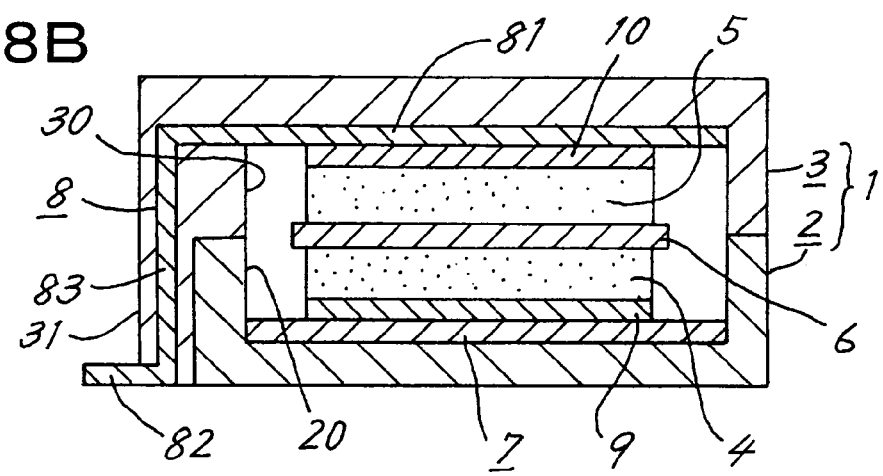
FIGS. 8B and 8C are sectional views of the same.
Figure 8C:
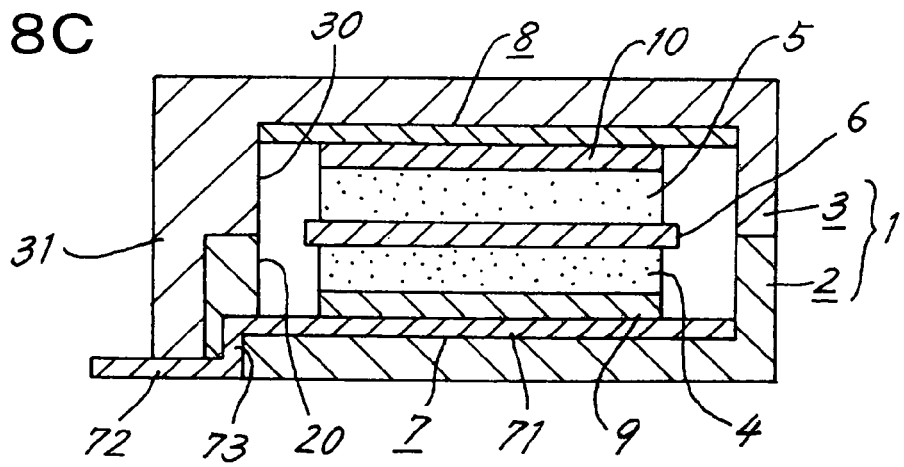

Next, a description will be given of an electric double layer capacitor of third embodiment. FIG. 8A is a perspective view of this capacitor, FIG. 8B is a view in section taken along a vertical plane containing the line D—D in FIG. 8A and showing the capacitor as seen in the direction of the arrows shown, and FIG. 8C is a view in section taken along a vertical plane containing the line E—E in FIG. 8A and showing the capacitor as seen in the direction of the arrows shown. With the third embodiment, both a first lead member 7 and a second lead member 8 project from one sidewall (along the short side of a container 1) of the container 1 in parallel to each other.

Figure 9:
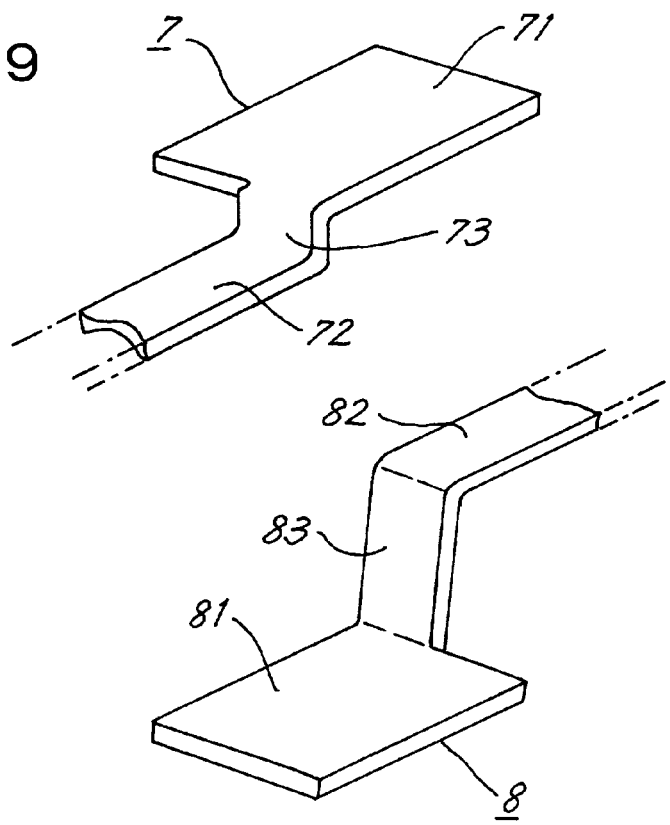
FIG. 9 is a perspective view of a first and a second lead member of the capacitor or the cell of the third embodiment of the invention.

FIG. 9 is a perspective view showing the first lead member 7 and the second lead member 8 before the insert molding of first and second container half segments 2, 3. These lead members 7, 8 are made by bending a strip of metal plate varying stepwise in width. As compared with the lead member 7 of the first embodiment shown in FIG. 2, the first lead member 7 of the third embodiment is smaller in the width of the second flat plate portion 72 and in the width of the vertical portion 73. Preferably, these widths are slightly smaller than half of the width (of short side of the container) of the first flat plate portion 71. The second lead member 8 of the third embodiment is also shaped similarly. With the third embodiment, the second flat plate portion 72 and the vertical portion 73 are positioned as shifted toward one side of the first flat plate portion 71, and the second flat plate portion 82 and the vertical portion 83 are positioned as shifted toward one side of the first flat plate portion 81. However, the first and second lead members 7, 8 need not be thus shaped but can be shaped as desired insofar as these members are free from interference with each other when used in combination.

Figure 10:
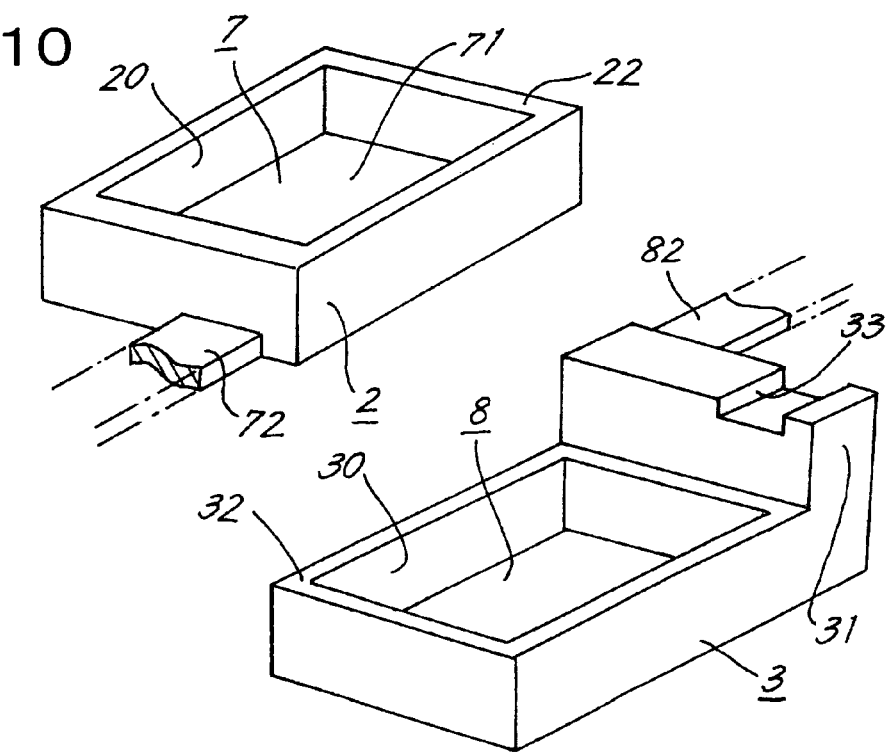
FIG. 10 is a perspective view of a first and a second container half segment of the capacitor or the cell of the third embodiment.

FIG. 10 is a perspective view of the first and second container segments 2, 3 of the third embodiment. These segments 2, 3 are formed by insert molding in a process similar to those for the foregoing embodiments. The second flat plate portion 72 of the first lead member 7 projects from one side wall of the first container segment 2 (which wall is positioned along the short side of the segment 2) and is disposed closer to a (longitudinal) side wall of the first segment 2. The second flat plate portion 82 of the second lead member 8 projects from the outer side surface of an extension 31 of the second container segment 3 and is disposed closer to one (longitudinal) side wall of the second segment 3. A groove 33 is formed in the end of the extension 31 of the second segment 3 and is positioned closer to the other (longitudinal) side wall of the segment 3. When the first and second container segments 2, 3 are fitted together in combination, the second flat plate portion 72 of the first lead member 7 is fitted in the groove 33.

When the first and second container segments 2, 3 shown in FIG. 10 are made, the electric double layer capacitor shown in FIGS. 8A to 8C are fabricated in the same manner as the first embodiment. With reference to FIG. 8C, the portion of the first lead member 7 closer to one end thereof extends through the container 1, more specifically through a side wall and a bottom portion of the first container segment 2, further extends through the groove 33 formed in the extension 31 of the second container segment 3 and is led out of the container to the outside. With reference to FIG. 8B, the portion of the second lead member 8 closer to one end thereof extends through the container 1, more specifically through a side wall and the extension 31 of the second container segment 3, and is led out of the container 1 to the outside. As seen in FIGS. 8B and 8C, the outer end portions (electrode terminal portions) of the lead members 2, 3 are arranged on substantially the same plane as the outer lower surface of the container 1.

In the case where the first and second container segments 2, 3 are joined by ultrasonic welding in fabricating an electric double layer capacitor, the electrolyte impregnating the polarizable electrodes 4, 5 and the separator 6 (placed into the recess 20) is forced out by being subjected to ultrasonic vibration. In a state in which the first and second container segments 2, 3 still remain to be fully joined, the electrolyte forced out is scattered around through an interstice created between the segments 2, 3. To assure the capacitor of its performance, diminish the consumption of the electrolyte and protect the health of the persons participating in the fabrication, it is desired that such dissipation of the electrolyte be diminished. Such a request is fulfilled by a fourth embodiment of the invention, i.e., another electric double layer capacitor, and a process for fabricating the capacitor.

Figure 11:
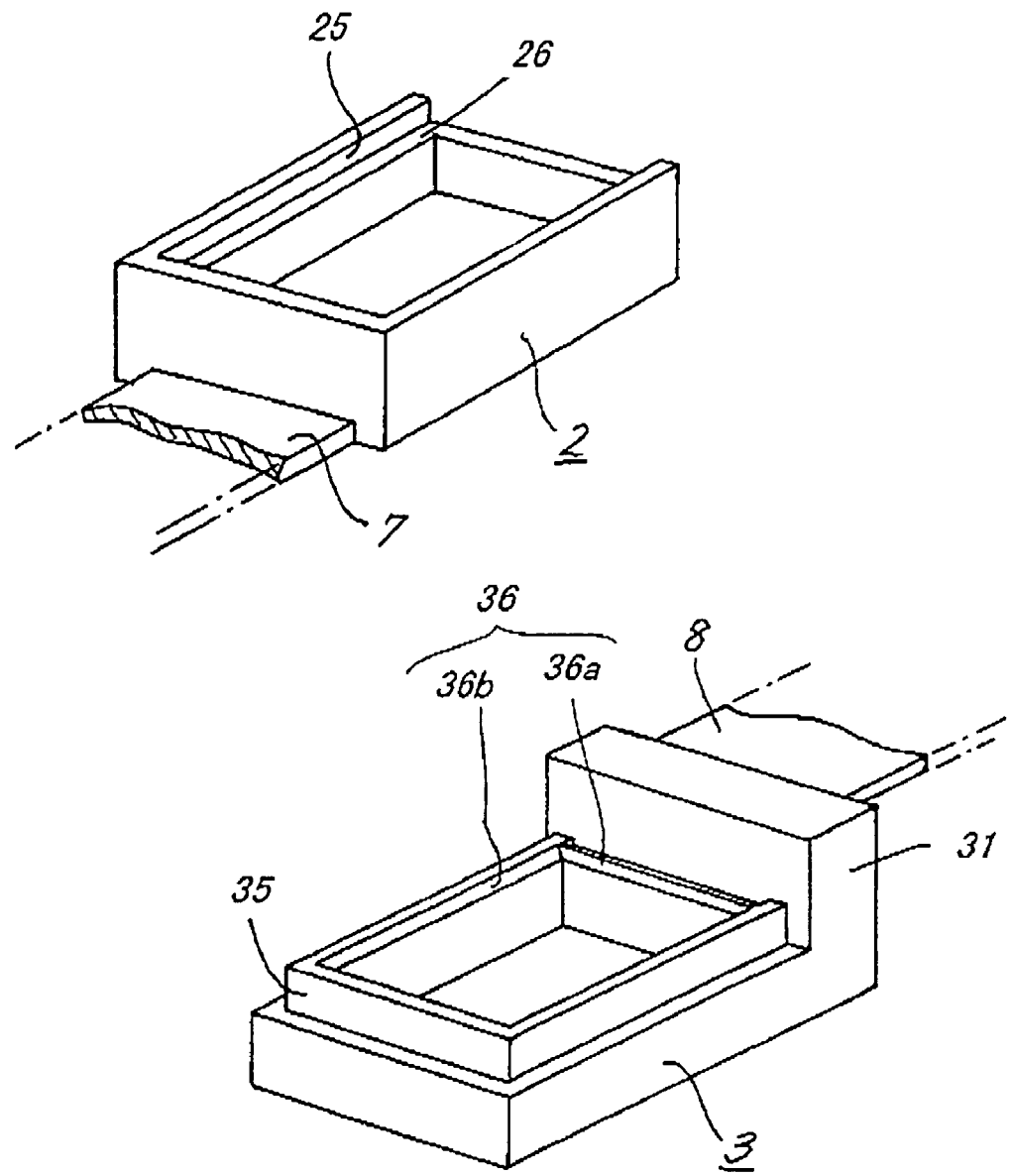
FIG. 11 is a perspective view of a first and a second container half segment of a fourth embodiment of the invention, i.e., an electric double layer capacitor or electrolytic cell.

FIG. 11 is a perspective view showing a first container half segment 2 and a second container half segment 3 for use in the process for fabricating the electric double layer capacitor of fourth embodiment. These container segments 2, 3 are similar to the segments 2, 3 of the first embodiment in construction but differ therefrom in the following features.

First, the first container segment 2 of the fourth embodiment is provided at the upper end thereof with a scatter preventing wall portion 25 which is generally U-shaped. Formed inwardly of the scatter preventing wall portion 25 is an annular planar portion 26. Second, the second container segment 3 of the fourth embodiment has a fitting wall portion 35 fittable in the scatter preventing wall portion 25. The fitting wall portion 35 is annular so as to surround a recess 30 and has a ridge 36 formed on the top end thereof. The ridge 36 is shaped in the form of a wedge at the portion 36a thereof extending along an extension 31, and in a trapezoidal form at the other portion 36b thereof. When the first and second container segments 2, 3 are fitted together in combination, the scatter preventing wall portion 25 is in contact with the inner side surface of the extension 31, and the ridge 36 is surrounded by the scatter preventing wall portion 25 and the extension 31.

Figure 12A:
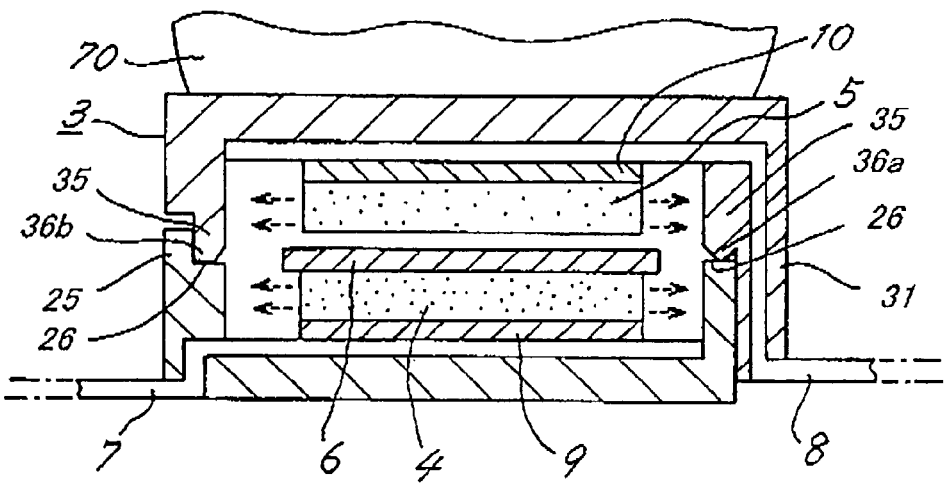
FIG. 12A is a sectional view showing a process for fabricating the capacitor or the cell of the fourth embodiment.

FIG. 12A is a sectional view showing how the first and second container segments 2, 3 are joined by ultrasonic welding. As already described with reference to the first embodiment, the second segment 3 is placed on the first segment 2, and a transducer 70 is thereafter pressed against the bottom outer surface of the second segment 3 facing upward. The vibration of the transducer 70 forces out the electrolyte from the first polarizable electrode 4, etc. as indicated in broken lines in the drawing. In the case of the fourth embodiment, however, the ridge 36 is surrounded by the scatter preventing wall portion 25 and the extension 31, so that the electrolyte is blocked by the wall portion 25 and the extension 31 even if forced outward through an interstice between the ridge 36 and the planar portion 26. Consequently, the electrolyte is prevented from scattering around during the ultrasonic welding operation.

Figure 12B:
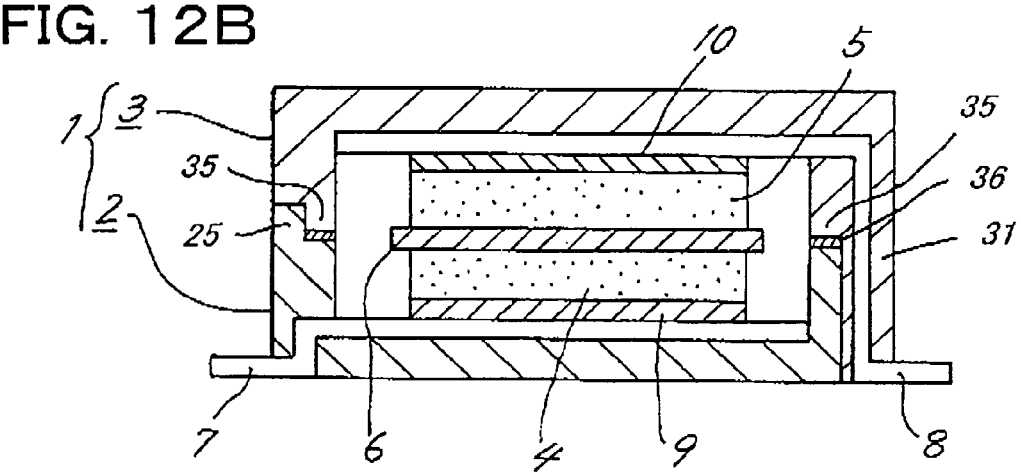
FIG. 12B is a sectional view showing the capacitor or the cell as completed.

The electric double layer capacitor of the fourth embodiment resembles the capacitor of the first embodiment shown in FIG. 1A in contour. FIG. 12B is a sectional view of the capacitor of the fourth embodiment. The ridge 36 melted by ultrasonic vibration solidifies on the planar portion 26, whereby the first and second container segments 2, 3 are joined.

The present invention can be applied to aqueous or nonaqueous electrolytic cells. In this case, the first polarizable electrode 4, for example, of the embodiments described is replaced by a positive electrode (positive electrode active substance), and the second polarizable electrode 5 by a negative electrode (negative electrode active substance) (and vice versa). When the present invention is to be embodied as a lithium ion cell, the positive electrode 4 to be used is made from a powder of lithium cobaltite, lithium manganate or lithium nickelate by pressure molding or sintering. The negative electrode 5 to be used is made from a powdery carbon material of the graphite type or coke type by pressure molding or sintering. The electrolyte to be used is an organic solvent having dissolved therein a lithium salt such as $LiBF_4$ or $LiClO_4$. The organic solvent to be used is propylene carbonate, gamma-butyrolactone or the like. The separator 6 to be used is a porous film of a high polymer such as polyolefin, polyethylene or polypropylene. The first current collecting member 9 is made from aluminum or the like, and the second current collecting member 10 from copper or the like. Accordingly, the first collecting member 9 may be made integral with the first lead member 7, and the second collecting member 10 with the second lead member 8.

When the present invention is to be embodied as a nickel-hydrogen cell, the positive electrode 4 is made from a powder or pellets of nickel oxide, and expanded nickel, and the negative electrode 5 is made from a powder or pellets of hydrogen-absorbing Mm—Ni—Co—Mn—Al (wherein Mm is a mixture of rare-earth elements) alloy, and expanded nickel. Incidentally, the first and second current collecting members 9, 10 illustrated are not used in this case. The electrolyte to be used is KOH or high-polymer hydrogel electrolyte. The separator 6 to be used is a porous film of a high polymer such as sulfonated polypropylene.

The embodiments described above are intended to illustrate the present invention and should not be construed as limiting the invention set forth in the appended claims or reducing the scope thereof. The devices of the invention are not limited to the foregoing embodiments in construction but can of course be modified variously within the technical scope defined in the claims.

What is claimed is:

1. An electric double layer capacitor comprising a container made from a resin in a substantially rectangular parallelepipedal form by joining a first container half segment and a second container half segment each in the form of a box, the container having housed therein a pair of polarizable electrodes impregnated with an electrolyte, the second container segment being provided at one end thereof with an extension extending along an outer side surface of the first container segment to a bottom outer surface thereof, the extension having an end face in a common plane with the bottom outer surface of the first container segment, a platelike first lead member being provided on a bottom wall of a recessed portion of the first container segment, the first lead member being electrically connected to one of the pair of the electrodes, a platelike second lead member being provided on a bottom wall of a recessed portion of the second container segment, the second lead member being electrically connected to the other electrode, the first lead member having a portion closer to one end thereof and embedded in the first container segment, the first lead member portion being bent as embedded in the first container segment and being led out of the container to the outside thereof, and the second lead member having a portion closer to one end thereof and embedded in the second container segment, the second lead member portion being bent as embedded in the second container segment and extending through the extension to the outside of the container, the first lead member portion and the second lead member portion having respective outer ends projecting outward from the container and arranged on substantially the same plane as an outer lower surface of the container.

2. An electric double layer capacitor according to claim 1 wherein the respective outer ends of the first lead member portion and the second lead member portion project outward from the container in directions opposite to each other.

3. An electric double layer capacitor according to claim 1 wherein the outer end of the first lead member portion projects in a direction perpendicular to the direction of projection of the outer end of the second lead member portion.

4. An electric double layer capacitor according to claim 1 wherein the respective outer ends of the first lead member portion and the second lead member portion both project outward from one side wall of the container in parallel.

5. A process for fabricating an electric double layer capacitor including the steps of:

making a first container half segment in the form of a box by insert molding, the first container segment having a platelike first lead member disposed on a bottom wall of a first recessed portion thereof, the first lead member having a portion closer to one end thereof and embedded in the first container segment, the first lead member portion being bent as embedded in the first container segment and having an outer end positioned on substantially the same plane as a bottom outer surface of the first container segment, making a second container half segment in the form of a box by insert molding, the second container segment having a platelike second lead member disposed on a bottom wall of a second recessed portion thereof, the second lead member having a portion closer to one end thereof and embedded in the second container segment, the second lead member portion being bent as embedded in the second container segment and extending along an extension of the second container segment formed at one end thereof, the second lead member portion having an outer end projecting outward from an outer side surface of the extension and positioned on substantially the same plane as an end face of the extension, joining a first polarizable electrode to the first lead member directly or with a first current collecting member interposed therebetween and impregnating the first electrode with an electrolyte, joining a second polarizable electrode to the second lead member directly or with a second current collecting member interposed therebetween and impregnating the second electrode with the electrolyte, and making a substantially rectangular parallelepipedal container by joining the first container segment and the second container segment in combination so that the end face of the extension is positioned on substantially the same plane as the bottom outer surface of the first container segment.

6. A process for fabricating an electric double layer capacitor according to claim 5 wherein the first container segment and the second container segment are joined by ultrasonic welding.

7. An electrolytic cell comprising a container made from a resin in a substantially rectangular parallelepipedal form by joining a first container half segment and a second container half segment each in the form of a box,
the container having housed therein a positive electrode and a negative electrode impregnated with an electrolyte,
the second container segment being provided at one end thereof with an extension extending along an outer side surface of the first container segment to a bottom outer surface thereof,
the extension having an end face in a common plane with the bottom outer surface of the first container segment,
a platelike first lead member being provided on a bottom wall of a recessed portion of the first container segment, the first lead member being electrically connected to one of the positive electrode and the negative electrode,
a platelike second lead member being provided on a bottom wall of a recessed portion of the second container segment, the second lead member being electrically connected to the other electrode,
the first lead member having a portion closer to one end thereof and embedded in the first container segment, the first lead member portion being bent as embedded in the first container segment and being led out of the container to outside thereof,
the second lead member having a portion closer to one end thereof and embedded in the second container segment, the second lead member portion being bent as embedded in the second container segment and extending through the extension to outside of the container, and the first lead member portion and the second lead member portion having respective outer ends projecting outward from the container and arranged on substantially the same plane as an outer lower surface of the container.

8. An electrolytic cell according to claim 7 wherein the respective outer ends of the first lead member portion and the second lead member portion project outward from the container in directions opposite to each other.

9. An electrolytic cell according to claim 7 wherein the outer end of the first lead member portion projects in a direction perpendicular to the direction of projection of the outer end of the second lead member portion.

10. An electrolytic cell according to claim 7 wherein the respective outer ends of the first lead member portion and the second lead member portion both project outward from one side wall of the container in parallel.

11. A process for fabricating an electrolytic cell including the steps of:
making a first container half segment in the form of a box by insert molding, the first container segment having a platelike first lead member disposed on a bottom wall of a first recessed portion thereof, the first lead member having a portion closer to one end thereof and embedded in the first container segment, the first lead member portion being bent as embedded in the first container segment and having an outer end positioned on substantially the same plane as a bottom outer surface of the first container segment, making a second container half segment in the form of a box by insert molding, the second container segment having a platelike second lead member disposed on a bottom wall of a second recessed portion thereof, the second lead member having a portion closer to one end thereof and embedded in the second container segment, the second lead member portion being bent as embedded in the second container segment and extending along an extension of the second container segment formed at one end thereof, the second lead member portion having an outer end projecting outward from an outer side surface of the extension and positioned on substantially the same plane as an end face of the extension, joining one of a positive electrode and a negative electrode to the first lead member directly or with a first current collecting member interposed therebetween and impregnating said first polarizable electrode with an electrolyte, joining the other electrode to the second lead member directly or with a second current collecting member interposed therebetween and impregnating said other electrode with the electrolyte, and making a substantially rectangular parallelepipedal container by joining the first container segment and the second container segment in combination so that the end face of the extension is positioned on substantially the same plane as the bottom outer surface of the first container segment.

12. A process for fabricating an electrolytic cell according to claim 11 wherein the first container segment and the second container segment are joined by ultrasonic welding.

* * * * *